United States Patent [19]

Bossert et al.

[11] Patent Number: 5,718,817
[45] Date of Patent: Feb. 17, 1998

[54] CATALYST FOR LOW TEMPERATURE CURE OF BLOCKED ISOCYANATES

[75] Inventors: Emily Carol Bossert, Wayne, Pa.; Wayne Ranbom, Hopewell; William Albert Larkin, Avon by the Sea, both of N.J.

[73] Assignee: Elf Atochem North America, Inc., Philadelphia, Pa.

[21] Appl. No.: 97,854

[22] Filed: Jul. 28, 1993

[51] Int. Cl.$^6$ .................................... C09D 5/44
[52] U.S. Cl. .................. 204/501; 204/505; 428/418; 523/415
[58] Field of Search ................. 523/410, 415; 528/45, 58; 204/505, 506, 501, 504, 499; 502/155, 168; 428/170, 418

[56] References Cited

U.S. PATENT DOCUMENTS

| | | |
|---|---|---|
| 3,084,177 | 4/1963 | Hostettler et al. . |
| 3,240,730 | 3/1966 | Hostettler et al. . |
| 3,392,128 | 7/1968 | Hostettler et al. . |
| 3,392,153 | 7/1968 | Hostettler et al. . |
| 3,523,103 | 8/1970 | Zemlin . |
| 4,017,438 | 4/1977 | Jerabek et al. ............ 523/410 |
| 4,031,050 | 6/1977 | Jerabek . |
| 4,032,468 | 6/1977 | Treadwell et al. . |
| 4,087,412 | 5/1978 | Groves ..................... 525/123 |
| 4,101,486 | 7/1978 | Bosso et al. . |
| 4,256,621 | 3/1981 | Shimokai et al. . |
| 4,286,073 | 8/1981 | Coe . |
| 4,865,704 | 9/1989 | Saatweber et al. ........ 204/181.7 |
| 4,968,823 | 11/1990 | Kiyama et al. . |
| 4,981,924 | 1/1991 | Nichols et al. . |
| 5,063,269 | 11/1991 | Hung . |
| 5,089,583 | 2/1992 | Nichols et al. . |
| 5,115,070 | 5/1992 | Harris et al. . |
| 5,116,914 | 5/1992 | Chung et al. . |
| 5,356,529 | 10/1994 | Eswarakrishnan et al. ......... 205/224 |

FOREIGN PATENT DOCUMENTS

| | | |
|---|---|---|
| 930493 | 7/1973 | Canada . |
| 1159633 | 12/1963 | Germany . |
| 947587 | 1/1964 | United Kingdom . |
| WO94/25534 | 11/1994 | WIPO . |

OTHER PUBLICATIONS

Gum, Riese and Ulrich, eds, Reaction Polymers, 1992 pp. 58 and 59.

"Elu fluβ von Wasser . . . ," thiele pp. 1–3 (1989).

Sep. 28, 1995 Search Report from the European Patent Office in corresponding application EPA 94925683.8-2115 and Annex thereto.

"Einfluβ von Wasser auf die Insertionskatalyse bei der Urethanbildung", Lothar Thiele, Plaste und Kautschuk, 36. Jahrgang, Heft 1, pp. 1–3, Jan. 1989 (with attached English translation).

*Primary Examiner*—Melvyn I. Marquis
*Assistant Examiner*—D. Aylward
*Attorney, Agent, or Firm*—Finnegan, Henderson, Farabow, Garrett & Dunner, L.L.P.

[57] ABSTRACT

The present invention comprises a curable composition comprising:

(i) a blocked reactive component comprising a blocked isocyanate or a blocked isothiocyanate;

(ii) a functional compound containing reactive hydrogen;

(iii) a triorganotin catalyst for promoting the reaction of the blocked reactive component with the functional compound. The composition may also be admixed with water. The invention also relates to a method for curing a blocked isocyanate or blocked isothiocyanate at a temperature below about 150° C. which comprises combining a triorganotin compound with the blocked reactive component and functional compound and heating at a temperature less than about 150° C. to obtain a cured urethane or thiourethane.

21 Claims, No Drawings

CATALYST FOR LOW TEMPERATURE CURE OF BLOCKED ISOCYANATES

BACKGROUND OF THE INVENTION

1. Field of the Invention

The invention is directed to tin catalysts to promote the low temperature cure of blocked isocyanates and blocked isothiocyanates.

2. Description of Related Art

Organotin compounds, particularly diorganotins, are commonly used for the curing reaction of blocked isocyanates with hydroxyl-containing compounds. These systems find applications in coatings, where the hydroxyl-containing compound is polymeric and the blocked isocyanate is multifunctional. Frequently, the blocking agent is an aliphatic alcohol, which imparts long pot life in one pot systems. Reaction of the pendant hydroxyl groups with the multifunctional blocked isocyanate occurs at elevated temperatures in a cross-linking reaction which increases the molecular weight and results in a cured coating which has excellent solvent resistance.

Due to environmental considerations, the coatings industry has been turning to systems wherein the reactants are dispersed in an aqueous system. These systems require the formation of stable dispersions and hydrolytic stability for all reactants. In particular, primer coatings may be deposited from aqueous dispersion onto metal surfaces by cathodic deposition, as described by Bosso et al., U.S. Pat. No. 4,101,486.

Catalysts are usually needed in order to promote the curing reaction when the blocking agent is an aliphatic alcohol. Conventionally, these catalysts are stannous salts or mono- or diorganotin compounds which catalyze the curing or cross-linking reaction at temperatures in the range 330°–365° F. It is often desirable to obtain curing reactions at lower temperatures in order to conserve energy, reduce deformation of plastic parts attached to the metal object, and reduce color formation.

Thiele et al., *Plaste und Kautschuk*, 36 January 1989 (1) pp. 1–3, disclose the reaction of phenylisocyanate and butanol in the presence of bis tributyltin oxide as a model reaction for urethane polymers wherein the addition of one mol percent water retarded the rate of reaction and caused a deviation in the linearity in Eyring diagrams. The retarding effect of the water may be reduced by increasing the temperature. The reference suggests that triorganotin catalysts are not suitable in aqueous systems where lower temperature cures are required.

Jerabek U.S. Pat. No. 4,031,050, Jerabek et al., U.S. Pat. No. 4,017,438 and Bosso et al. describe aqueous coating compositions based on blocked organic polyisocyanates, an amine adduct of an epoxy group-containing resin and a diorganotin catalyst. These compositions are cationic and may be electrodeposited on a cathode and are widely employed as primers for automotive substrates. In this process, a conductive article such as an auto body or an auto part is immersed in a bath of the aqueous coating and acts as an electrode in the electrodeposition process. An electric current is passed between the article and a counter-electrode in electrical contact with the aqueous coating until a desired coating thickness is deposited on the article.

The amine adduct of the epoxy resin is cationic and is readily coated on cathodic metal substrates such as auto bodies or auto parts. The coating operation may be conducted as a continuous process which requires the bath to be monitored and replenished periodically with the coating composition and/or components of the composition which are depleted as successive coating operations are carried out.

The diorganotin catalyst employed is a solid that is dispersed in the coating composition and in some instances will separate from the coating and deposit, with other coating residues, on the bottom of the tank which contains the coating bath. The amount of catalyst in the bath, therefore can be depleted requiring that it be replenished so that the cure of the coating is effected in a timely manner. Replenishing the solid catalyst can be difficult or a disadvantage since it has to be properly dispersed in a suitable medium before being introduced into the bath.

Although these cationic amine adducts of the epoxy resin can be formulated with pigments and/or fillers, attempts are being made to provide coating systems that do not have any solid materials in them as a cost savings measure and also to eliminate various problems in the coating tank with solid materials settling to the bottom of the tank which include solid organotin compounds. These materials that settle have to be separated by an ultrafiltration process and where catalyst is removed in this process, it has to be replaced. An essentially solids-free coating system would therefore be desirable to avoid or minimize the settling problem. Additionally, the expense of preparing such a coating could be reduced by eliminating any grinding step that would be required to disperse catalysts and/or pigments, fillers and the like in the coating composition.

Coatings without pigments or fillers can be used as first coats in several applications where subsequent coats would provide the pigment materials that are in some instances necessary to protect the coating from ultraviolet radiation or other environmental hazards that could cause the coating to deteriorate at an unacceptable rate.

If coatings of this type can be applied electrolytically at a faster rate as well as cured at a faster rate, an increase in production rates would be obtained which represent a cost savings to the manufacturer.

Although the cationic amine-epoxy resins can be applied to metallic substrates electrolytically, these types of coatings are self-limiting by which it is meant that after a certain thickness, the coating build up slows and eventually stops since the coating material is insulating. Higher build coatings are an advantage since equivalent coating thicknesses can be applied more quickly or the full thickness of the coating can be obtained to provide improved physical properties such as impact resistance, corrosion resistance and the like.

Additionally, one problem encountered with some prior art coatings of this type is the inability to obtain a sufficient coating thickness at the edge of the object being coated. Edges, with this reduced coating tend to wear or corrode faster and can be regions on the metal article where a loss of structural integrity will occur first.

It is also desirable to eliminate pigments and/or fillers in coating compositions of this type since they are a source of pinholing in the coating which compromises the integrity of the coating layer and consequently exposes the metal substrate to wear and corrosion.

It would therefore be an advantage to obtain a catalyst that would promote the cure of these type of coatings at substantially the same rate as the catalyst presently used and which would be easily incorporated into the coating composition and would not tend to separate during use. Catalyst that are liquids at coating conditions and which are either soluble or readily dispersible, i.e., emulsified in the coating composition would be especially preferred in this regard.

Chung et al. U.S. Pat. No. 5,116,914 notes that dibutyltin oxide, which is used as a catalyst in these aqueous coatings is difficult to disperse whereas dibutyltin dilaurate can be hydrolyzed which causes cratering problems in the deposited film. The patentees describe the use of a dibutyltin diacetyl acetonate catalyst to avoid these problems.

Treadwell et al. U.S. Pat. No. 4,032,468 describes the use of a trimethyl or a trimethylmethoxytin oxide catalyst for the preparation of hydrolytically stable urethane foam precursors. The foam is formed by the reaction of the isocyanate component of the urethane foam with water.

Coe U.S. Pat. No. 4,286,073 describes the use of tributyltin toluenesulfonate or methanesulfonate catalysts for the manufacture of urethanes whereas Groves, U.S. Pat. No. 4,087,412 teaches a mixture of trialkyltin oxide and a reaction product of a carboxylic acid and a dialkyl tin oxide catalyst for the formation of polyurethane polymers. Zemlin, U.S. Pat. No. 3,523,103 describes the use of a tri-organoditin catalyst for the formation of polyurethanes.

Accordingly, catalysts that would not detract from the stability of the electrolytic bath employed according to the Jerabek, Jerabek et al. and Bosso et al. patents would be advantageous. Additionally, it would be an advantage to provide a catalyst that had improved throwing power in such baths, i.e., an increase in the amount of coating deposited in remote areas. Catalysts that also promote the deposition of coatings from these baths at a lower weight but afford equivalent protection as do heavier coatings are also desirable. When used as automotive coatings, this would result in some reduction in automobile weight leading to some measure of emission reduction and improvement in fuel economy. Other properties which are sought in these types of catalysts include improved ultrafiltration, reduced grind preparation, increased deposition rate, improved dispersability or emulsifiability, reduced cure temperatures, easier handling, improved color maintenance and a lower level of catalyst used.

SUMMARY OF THE INVENTION

Accordingly, the present invention is directed to a composition and a process that substantially obviates one or more of these and other problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the composition of matter and process, particularly pointed out in the written description and claims hereof.

To achieve these and other advantages and in accordance with the purpose of the invention, as embodied and broadly described, the invention comprises a curable composition comprising:

(i) a blocked reactive component wherein the blocked reactive component is a blocked isocyanate or a blocked isothiocyanate;

(ii) a functional compound reactive with the blocked reactive component, the functional compound containing reactive hydrogen;

(iii) a triorganotin catalyst for promoting the reaction of the reactive component with the blocked functional compound.

The composition may also be admixed with water.

The invention also relates to a method for curing a blocked isocyanate or blocked isothiocyanate at a temperature below about 150° C. which comprises combining a triorganotin compound with the aforesaid blocked reactive component and functional compound and heating at a temperature less than about 150° C. especially from about 130° to less than about 150° C. to obtain a cured urethane or thiourethane.

DETAILED DESCRIPTION

This invention discloses triorganotin-based catalysts which promote the cure of blocked isocyanates and especially aliphatic alcohol-blocked isocyanates or isothiocyanates at temperatures lower than about 150° C. It is unexpected that the triorganotin compounds, which are not conventional catalysts for urethane or thiourethane reactions should function as catalysts at lower temperatures than conventional diorganotin compounds such as dibutyltin oxide. The catalyst of the present invention comprises a triorganotin catalyst for promoting the reaction of a blocked isocyanate or isothiocyanate with a compound having active hydrogen and comprises: $R_3SnA$ wherein each R is a hydrocarbyl group bonded directly to tin through carbon and may be the same or different, branched or unbranched, saturated or unsaturated, substituted or unsubstituted comprising $C_1$ to about $C_{18}$ alkyl, $C_6$ to about $C_{20}$ aryl, cycloalkyl, alkaryl, vinyl and allyl. A is $-O-SnR_3$, $-S-SnR_3$, $-O-SnR_2X$, $-O-SnRX_2$, $-SR$,

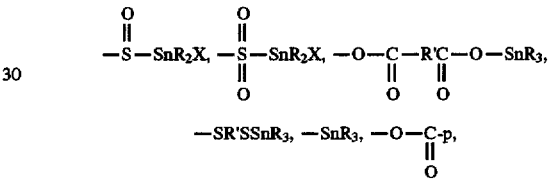

X, in which R is as defined above, R' is a divalent hydrocarbyl group which may be saturated or unsaturated, branched or unbranched, substituted or unsubstituted, aryl $C_6$ to about $C_{20}$, alkyne of about $C_4$ to $C_{20}$, "p" represents a polymer of 5 to 1000 repeating units, X is an anion comprising chlorine, bromine, iodine, fluorine, hydroxyl, carboxyl, alkoxy, hydride, sulfonate, toluene sulfonate, $C_1$-$C_5$ alkyl sulfonate, phosphate, silicate, carbonate and isocyanate.

These catalysts comprise:

Triorganotin catalysts for the reaction of "blocked" isocyanates with active hydrogen components and include:

I. bis-(triorganotin)oxides of the formula:

$R^1 R^2 R^3 Sn-O-Sn R^4 R^5 R^6$ wherein each R is a hydrocarbyl group bonded directly to tin through carbon and may be the same or different and is:

alkyl of $C_1$ to about $C_{18}$ which may be branched or unbranched, saturated or unsaturated, substituted or unsubstituted; aryl, alkaryl, cycloalkyl, vinyl or allyl, all of which may be substituted or unsubstituted by halo, hydroxyl, $C_1$ to about $C_{10}$ aryl and $C_1$ to about $C_5$ alkyl groups.

Examples of this class of triorganotins include:
bis (trimethyltin) oxide
bis (triethyltin) oxide
bis (tripropyltin) oxide
bis (tributyltin) oxide
bis (triamyltin) oxide
bis (trihexyltin) oxide
bis (triheptyltin) oxide
bis (trioctyltin) oxide
bis (tri-2-ethylhexyltin) oxide
bis (trinonyltin) oxide bis (tridecyltin) oxide
bis (tridodecyltin) oxide
bis [tris(tridecyl)tin] oxide
bis [tris(pentadecyl)tin] oxide
bis [tris(hexadecyl)tin] oxide
bis [tris(heptadecyl)tin] oxide
bis [tris(octadecyl)tin] oxide
(trimethyltin) (tributyltin) oxide
(tributyltin) (tri-n-octyltin) oxide
(trioctyltin) (trioctadecyltin) oxide
(dioctylbutyltin) (trioctyltin) oxide
bis (trioleyltin) oxide
bis (3,3,5 trimethylpentyltin) oxide
bis (triphenyltin) oxide
bis (tricyclohexyltin) oxide
bis (tribenzyltin) oxide
bis (trivinyltin) oxide
bis (triallyltin) oxide
(triallyltin) (trioctyltin) oxide
bis (tritolyltin) oxide
bis [tri(monohydroxyoctyl)tin] oxide
bis (tri-para-chlorophenyltin) oxide II. bis (triorganotin)sulfide of the formula:
$R^1 R^2 R^3 Sn—S—Sn R^4 R^5 R^6$ wherein each R is a hydrocarbyl group bonded to tin and is taken from the same R groups as described in I. above.
Examples of this class include:
bis (trioctyltin) sulfide
bis (tributyltin) sulfide
bis (trilauryltin) sulfide
bis (triphenyltin) sulfide III. (triorganotin) (diorgano X tin) oxide of the formula:
$R^1 R^2 R^3 Sn—O—Sn R^4 R^5 X$ wherein each R group is a hydrocarbyl group bonded to tin through carbon and is taken from the same R groups as described in I. above. X is carboxyl of 1 to about 20 carbon atoms, halide, hydroxyl, sulfate, mercapto, the residue of a mercapto acid, mercapto alcohol or esters thereof.
Examples of this class include:
(trioctyltin) (dioctylmethoxytin)oxide
(tri-2-ethylhexyltin) (dioctylchlorotin) oxide
(trioctyltin) (dioctyllaurylcarboxytin) oxide
(trioctyltin) (dioctylhydroxytin) oxide
(tributyltin) (dibutyliso-octylmercaptoacetatotin) oxide IV. (Triorganotin) (diorgano X tin) sulfides and sulfones of the formula:
$(R^1 R^2 R^3 Sn) (R^4, R^5, X Sn)$ Sulfides wherein each R group is a hydrocarbyl group bonded to tin through carbon and is taken from the same R groups as described in I. above. X is carboxyl of $C_1$ to about $C_{20}$ atoms, halide, hyroxyl, sulfate, mercapto, a residue of a mercapto acid, mercapto alcohol or esters thereof. S is sulfur or sulfone.
Examples of the class include:
(trioctyltin) (dioctyl, chlorotin) sulfide
(trioctyltin) (dioctyl, hydroxytin) sulfone V. bis (triorganotin) dicarboxylates of the formula:
$R^1 R^2 R^3 Sn O_2C—X—CO_2—Sn—R^4, R^5, R^6$ wherein each R is a hydrocarbyl group bonded to tin through carbon and is taken from the same R groups as described in I. above. X is an alkyl group of $C_1$ to about $C_{18}$, alkenyl of $C_2$ to about $C_{18}$, alkyne of about $C_4$, cyclohexenyl.
Examples of this class includes:
bis (trioctyltin) adipate
bis (tributyltin) maleate
bis (trioctyltin) cyclohexene dicarboxylate VI. bis (triorganotin) dimercaptide of the formula:
$R^1 R^2 R^3 Sn—S—X—S—Sn R^4 R^5 R^6$ wherein each R is a hydrocarbyl group bonded to tin through carbon and is taken from the same R groups as described in I. above. X is an alkyl group of $C_1$ to about $C_{18}$, alkyne of about $C_4$, cyclohexenyl or paraxylyl.
Examples of this class include:
bis (trioctyltin) $\alpha^{\omega}$ dimercaptoparaxylene
bis (trioctyltin) cyclohexenedimercaptide
(trioctyltin) (dioctyl, lauryltin) dimercapto hexylene VII. Triorgantoin Salts of the formula:
$R^1 R^2 R^3 Sn X$ wherein each R is a hydrocarbyl group bonded to tin through carbon and is taken from the same R groups as in I. above. X is halo, chloro, bromo, iodo, fluoro, $C_1$ to about $C_5$ alkoxy, hydroxy, carbonate, phospate, phosphinate, isocyanate, sulfonate, carboxyl substituted or unsubstituted of $C_1$ to about $C_{20}$ carbon atoms, siloxinate, ethoxylate.
Examples of this class include:
tributyltinfluoride
trioctyltinchloride
trioctyltinoctanoate
trioctyltinmethoxide
trioctyltinhydroxide
trioctyltincarbonate
tributyltinphosphate
trilauryltinphosphate
trioctyltinisocyanate
trioctyltinphenate
trioctyltin-9,10-dihydroxystearate VIII. (triorganotin) (mono-organtotin) oxides of the formula:
$R^1 R^2 R^3 Sn—O—Sn R^4 X Y$ wherein each R is a hydrocarbyl group bonded to tin through carbon and is taken from the same R group described in I. above. X and Y may be the same or different and are halo, chloro, bromo, fluoro, hydroxyl, oxy, sulfur, carboxylate of $C_1$ to about $C_{20}$, alkoxy, a mercapto residue of a mercapto alcohol, mercapto acid or esters thereof.
Examples of the class include:
(trioctyltin) (mono-octyldihydroxytin) oxide
(triphenyltin) (monobutyldichlorotin) oxide IX. bis (triorgano) ditin of the formula:
$R^1 R^2 R^3 Sn—Sn R^4, R^5, R^6$ wherein R is a hydrocarbyl group bonded directly to tin through carbon and is taken from the same R groups as defined in I. above.
Examples of the class include:
bis (trioctyl) ditin
bis (tributyl) ditin X. Polymer bound triorganotin of the formula:

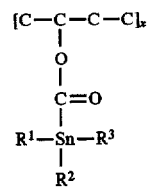

wherein each R is a hydrocarbyl group bonded to tin through carbon and is taken from the same R groups described in I. above. [C—C—C—C]$_x$ is representative of a polymer backbone group having a molecular weight of 2000 or greater, such as:

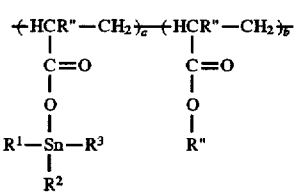

when R is as defined above, R" is hydrogen, methyl or ethyl, a+b represent a polymer of 5 to 1000 repeating units, b+a is from about 1 to about 20 and especially from about 3 to about 10.

It is to be understood that commercially produced products of the above described triorganotins may contain small quantities of organotin other than the principle component. It is also to be understood that where di or multifunctional anions or cations are present in the triorgantin structure, oligomerization, cyclization or polymerization may occur. Further, in all triorganotin components except when $R^1 R^2 R^3$ and $R^4 R^5 R^6$ are the same, equilibrium, mixtures may exist. Mixtures, and especially two, three or four component mixtures of the foregoing tin catalyst may also be used.

Triorganotin compounds useful as satisfactory catalysts in the reaction of blocked isocyanates with active hydrogen containing materials such as polyols depend not only on the structure and physical form of the triorganotin compound, but also on the presence or absence of solvents, processing temperature, and the composition of the reactants.

Tin catalysts that may be especially employed according to the invention comprise tributyltin oxide and especially bis(tri-n-butyltin) oxide, bis(trioctyltin) oxide and especially bis(tri-2-ethylhexyltin) oxide, bis(triphenyltin) oxide and triphenyltin hydroxide and other triorganotin catalysts such as tributyltin fluoride, triallyltin chloride, tributyltin hydride, triphenyltin hydride, tributyltin hydroxide, tributyltin methoxide, tributyltin butoxide, tributyltin acetate, tributyl N-piperazinylthiocarbonylmercaptide, tributyltinphosphorus dibutoxide, and bis-tributyltin oxide. Other tin catalysts that may be employed comprise tributyltin toluenesulfonate and tributyltin methanesulfonate, bis (trimethyltin) oxide, bis (trimethylmethoxytin) oxide and organoditin compounds such as hexabenzylditin, bis-trimethyltin, hexaethylditin, hexa-n-butylditin, hexaphenylditin, hexastearylditin, hexalaurylditin, trilauryltributylditin, hexaoctylditin. Various mixtures of the aforesaid tin catalysts can be used, especially the two or three or four component mixtures.

This triorgano tin catalyst in which each hydrocarbyl group bonded to tin is an alkyl group of $C_8$ to $C_{21}$ exhibits low toxicity and coating compositions using these catalysts present reduced environmental and health hazards.

In general, it is desirable that the triorganotin compound be a liquid at room temperature (about 25° C.) or be soluble in the reactant or conventionally employed solvent compatible with the system. Thus, the choice of triorganotin catalyst will be strongly influenced by the total system and the result sought.

The tin catalyst of the present invention can also be employed in combination with other known urethane catalysts such as known metal compounds which are used as catalysts or basic materials such as amines and alkali metal or alkaline earth metal salts and compounds. Tertiary amines having relatively high basicity are especially suitable in this regard. Additionally, azo compounds can be employed such as 1,4-diazabicyclo[2.2.2]octane, also known as triethylenediamine as well as 1-azabicyclo[2.2.2]octane and 1,8-diazabicyclo[5.3.0]undec-7-ene.

Heterocyclic nitrogen compounds can also be employed such as pyridine, pyrazine, pyrimidine, pyridazine, indolizine, phenazine, isoquinoline, quinoline, phthalazine, naphthrydine, quinoxaline, quinazoline, cinnoline and their derivatives.

Other amines and especially tertiary amines that may be employed as co-catalysts such as tri-lower alkyl amines are further described in Kirk-Othmer Encyclopedia of Chemical Technology, Third Edition under the heading "Amines" which is incorporated herein by reference.

Bismith and lead compounds may also be employed as co-catalysts as described by Britain et al., *J. Appl. Polym. Sci.* 4, 207 (1960) which is incorporated herein by reference as well as metal acetylacetonates based on manganese, vanadium, iron, copper, cobalt and chromium. Carboxylic acid salts of calcium, cobalt, manganese, zinc and zirconium may also be employed. Organomercury compounds or organolead compounds such as phenyl lead triacetate or lead hydrides or lead salts can also be used where toxicity is not a consideration. Generally, the heavy metal co-catalysts are not employed because of toxicity problems.

Other co-catalysts that may be employed include lithium oxide; sodium and potassium alkoxides; sodium formate, carbonate, benzoate, and borohydride; potassium and calcium acetates; alkali soaps; metal naphthenates; N,N-dimethylformamide; and Friedel Crafts-type catalysts. Additionally, potassium salts of carboxylic acids, ammonium salts of carboxylic acids and other tertiary amines, such as 2,4,6-tris(N,N-dimethylaminomethyl)phenol, 1,3,5-tris(3-dimethylaminopropyl)hexahydro-s-triazone, as well as ammonium salts can be used.

The terms "isocyanate" and isothiocyanates are used herein to refer to mono- and polyisocyanates and to mono- and polyisothiocyanates, respectively, including particularly diisocyanates and diisothiocyanates. While the invention has been described specifically with reference to the reaction of certain diisocyanates, it is generally applicable to the reaction of any compound containing one or more —N═C═Y groups in which Y is oxygen or sulfur. Examples of polyisocyanates suitable for the present invention include aliphatic compounds such as trimethylene, tetramethylene, pentamethylene, hexamethylene, 1,2-proplylene, 1,2-butylene, 2,3-butylene, 1,3-butylene, ethylidene and butylidene diisocyanates. Additionally, the cycloalkylene diisocyanates can be employed such as 1,3-cyclopentane, 1,4-cyclohexane, and 1,2-cyclohexane diisocyanates. The aromatic diisocyanates may also be used such as m-phenylene, p-phenylene, 4,4'-diphenyl, 1,5-naphthalene and 1,4-napthalene diisocyanates as well as the aliphatic-aromatic diisocyanates such as 4,4'-diphenylene methane, 2,4- or 2,6-tolylene or mixtures thereof, 4,4'-toluidine, and 1,4-xylylene diisocyanates. The nuclear substituted aromatic diisocyanates may also be employed such as dianisidine diisocyanate, 4,4'-diphenylether diisocyanate and chlorodiphenylene diisocyanate, 1,8-diisocyanato-p-menthane, 1-methyl-2,4-diisocyanatocyclohexane, chlorophenylene diisocyanates, diphenyl-methane-4,4'-diisocyanate and naphthalene-1,5-diisocyanate. Additionally, the triisocyanates such as triphenyl methane-4,4',4"-triisocyanate, 1,3,5-triisocyanate benzene and 2,4,6-triisocyanate toluene may also be employed. Tetraisocyanates may be utilized such as 4,4'-diphenyl-dimethyl methane-2,2',5,5'-tetraisocyanate as well as other isocyanates such as xylylene-α,α'-diisothiocyanate, isopropylbenzene-α,4-diisocyanate and polymerized polyisocyanates such as toluene diisocyanate dimers and trimers; dianisidine, diisocyanate (CAS Registry No. 91-93-0); tolidine diisocyanate (CAS Registry No. 91-97-4); biuret of hexamethylene diisocyanate (CAS Registry No. 4035-89-6); isophorone diisocyanate (CAS Registry No. 4098-71-9); polymeric diphenolmethane diisocyanate (CAS Registry No. 9016-87-9) or 4,4'-dicyclohexylmethane diisocyanate. Various mixtures of isocyanate may also be used especially the two, three, or four component mixtures.

The organic polyisocyanates may also be a prepolymer derived from a polyol and a polyisocyanate so that the polyol contains an isocyanate group or groups where the polyols include polyether polyols or polyester polyols or simple polyols such as glycols, including ethylene glycol and propylene glycol as well as glycerol, trimethylolpropane, hexanetriol, pentaerythritol, and the like.

As noted herein, the isocyanate of the present invention comprises a blocked isocyanate which is to say that the reactive isocyanate groups are reacted with any suitable aliphatic, cycloaliphatic, aromatic, or alkyl monoalcohol or phenolic compounds such as, for example, lower aliphatic alcohols including methyl, ethyl, chloroethyl, propyl, butyl, amyl, hexyl, heptyl, octyl, nonyl, decyl and lauryl alcohols, and 3,3,5-trimethylhexanol and the like. The aromatic-alkyl alcohols include phenylcarbinol and methylphenylcarbinol. Glycol ethers may be employed such as ethyl glycol monoethyl ether, ethyl glycol monobutyl ether and equivalents thereof. The phenolic compounds which may be employed comprise phenol, substituted phenols such as cresol, xylenol, nitrophenol, chlorophenol, ethyl phenol, t-butyl phenol and 2,5-di-t-butyl-4-hydroxy toluene. Other blocking agents that may be employed include tertiary hydroxyl amines such as diethylethanolamine, lactams such as caprolactam and oximes such as methyl ethyl ketone oxime, acetone oxime and cyclohexanone oxime. Use of the oximes and phenols in some instances is desirable because some specific polyisocyanates blocked with these oximes or phenols uncap at relatively low temperatures.

Bis (cyclic ureas) are blocked aliphatic diisocyanates and are preferred in some embodiments because no by-products are formed upon thermal release of the reactive isocyanate groups. These comprise compounds that can be referred to as self blocked isocyanates. Examples of these bis-cyclic ureas are described by Ulrich, *ACS Symp. Ser.* 172 519 (1981), Sherwood, *J. Coat. Technol.* 54 (689), 61 (1982) and Kirk-Othmer *Encyclopedia of Chemical Technology*, Third Edition, Volume 23, p. 584 all of which are incorporated herein by reference. Blocked isocyanates of the following formula [bis (cyclic ureas)] are especially of interest where R is a $C_1$ to about $C_{10}$ hydrocarbon radical:

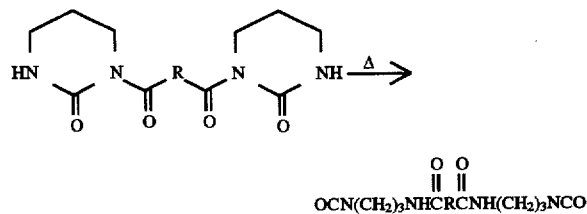

$$\text{OCN(CH}_2)_3\text{NHCRCNH(CH}_2)_3\text{NCO}$$
$$\overset{\text{O}}{\underset{}{\|}}\ \overset{\text{O}}{\underset{}{\|}}$$

The blocked reactive isocyanate or isothiocyanate of the present invention is reacted with a functional compound containing a reactive hydrogen as determined by the Zerewitinoff method described in *J. Am. Chem. Soc.*, Vol. 49, p. 3181 (1927). These compounds containing active hydrogens comprise compounds used for manufacturing a polyisocyanate prepolymer as previously described, e.g., polyols including polyether polyols or polyester polyols which is to say compounds containing hydroxyl groups. Additionally, compounds containing amino groups are also included within those materials that are functional compounds containing reactive hydrogen but generally include all compounds which give a positive test for reactive hydrogen as determined by the Zerewitinoff method. These compounds include but are not limited to, alcohols, hydroperoxides, phenols, boronic acids, carboxylic acids, percarboxylic acids and sulfonic acids and the like. Also included within this group are compounds containing a nitrogen-hydrogen bond such as amines, amides, lactams, ureas, urethanes, allophanates, biurets, acyl ureas, thioureas, hydrazines, oximes, amidines, hydroxylamines, hydrazones, hydroxamic acids, nitramines, diazoamino compounds and sulfonamides. Compounds containing a sulfur-hydrogen bond are also included such as mercaptans, thiophenols and thioacids. Other compounds which are included are halogen acids, compounds containing active methylene groups and compounds capable of forming enols such as acetone, malonic esters, acetoacetic esters, acetylacetone and nitromethane and miscellaneous active hydrogen-containing compounds such as acetylenic compounds and dialkyl phosphonates. Compounds containing two or more or any one or combination of active hydrogen groups already described are also included.

The functional compound may also comprise a resin which is an adduct of a primary and/or secondary amine with an epoxy group-containing resin or a resin which is an adduct of an amine-acid salt with a polyepoxide.

The epoxy material utilized to form the adduct can be any monomeric or polymeric compound or mixture of compounds having an average of one or more epoxy groups per molecule. A particularly useful class of polyepoxides are the polyglycidyl ethers of polyphenols such as Bisphenol A or polyepoxides produced from novolak resins or similar polyphenol resins. These epoxy resins are especially suitable for the preparation of amine adducts of epoxy resins which are based on primary or secondary amines and especially secondary amines and where the adducts are further reacted with an acid to provide catonic groups in the adduct.

Other polyglycidyl ethers of polyhydric alcohols may be employed, such as those based on ethylene glycol and the like as well as polyglycidyl esters of polycarboxlic acids. Polyepoxides derived from the epoxidation of an olefinically unsaturated alicyclic compound can also be used. Other epoxy-containing compounds and resins that may be employed include nitrogeneous diepoxides such as those disclosed in United States Patent Number U.S. Pat. No. 3,365,471; U.S. Pat. No. 3,391,097; U.S. Pat. No. 3,450,711; U.S. Pat. No. 3,312,664; U.S. Pat. No. 3,503,979 and British Patent No. 1,172,916 all of which are incorporated herein by reference.

Another class of polyepoxides which may be employed are acrylic polymers formed by copolymerizing an unsaturated epoxy-containing monomer such as, for example, glycidyl acrylic acid, glycidyl acrylates or methacrylates, a hydroxyl-containing unsaturated monomer such as a hydroxyalkyl ester of an acrylic acid or methacrylic acid and at least one other unsaturated monomer such as styrene, alpha-methylstryene, viny toluene and the like or olefinic acids and esters of acrylic acid or methacrylic acid such as, methyl acrylate, ethyl acrylate, methyl methacrylate and the like. These epoxy resins are especially suitable for the preparation of solubilized polyepoxide adducts having a quaternary ammonium salt group e.g., those having a backbone derived from the interpolymerization of an olefinically unsaturated glycidyl compound, a hydroxy alkyl ester of an acrylic acid or methacrylic acid and at least one other olefinically unsaturated monomer. Polyglycidyl ethers of a polyphenol may also be employed as epoxy resins in the preparation of the solubilized polyepoxide adducts having quaternary ammonium salt groups.

Epoxy resins which are an adduct of a primary and/or a secondary amine may be obtained by reacting such epoxy resins with an amine such as a water soluble amino compound including mono- and dialkylamines such as methylamine, ethylamine, propylamine, butylamine, dimethylamine, diethylamine, dipropylamine, dibutylamine, methylbutylamine, and the like. Higher molecular weight monoamines may be employed where it is preferred that the molecule be more flexible. Further, a mixture of low molecular weight and high molecular weight amines may also be employed to modify resin properties.

Quaternary ammonium group-containing epoxy resins are obtained by reacting the polyepoxide with an amine-acid salt, preferably a tertiary amine-acid salt, to form a quaternary amine salt group-containing resin. Primary and secondary amine-acid salts may be employed but the tertiary amine-acid salt is preferred.

Examples of amine-acid salts which may be employed include amine salts of boric acid or an acid having a dissociation constant greater than that of boric acid and preferably an organic acid having a dissociation constant greater than about $1 \times 10^{-5}$ such as lactic acid, acetic acid, formic acid, propionic acid, butyric acid, hydrochloric acid, phosphoric acid, sulfuric acid and the like. The amine-acid salt and the polyepoxide are reacted in the presence of water and the adduct thus obtained.

An amine adduct of an epoxy group-containing resin that is employed according to the invention is further described by Jerabek, U.S. Pat. No. 4,031,050, Jerabek et al., U.S. Pat. No. 4,017,438 and the resin containing active hydrogen atoms and quaternary ammonium groups prepared by the reaction of a polyepoxide with an amine salt that is employed according to the invention is described by Bosso et al., U.S. Pat. No. 4,101,486, all of which are incorporated herein by reference.

The functional compound reactive with the blocked isocyanate as described by Jerabek et al. is a polyfunctional compound based on a ketimine blocked amine having at least one active amine hydrogen wherein the ketimine blocked amine is reacted with an epoxy compound. In one embodiment these compounds are obtained by reacting the diketimine of diethylene triamine and methyl isobutyl ketone with a polyepoxide.

The various specific isocyanate and thioisocyanate materials that are employed according to the present invention as well as functional compounds containing reactive hydrogen are further described by Hostettler et al. U.S. Pat. Nos. 3,084,177; 3,240,730; 3,392,128 and 3,392,153 as well as Jerabek, Jerabek et al. and Bosso et al., all of which are incorporated herein by reference.

The following examples are illustrative of the invention.

A common method for comparing the degree of cure of a coating is to determine the extent to which a coating is removed by a solvent rub test described in ASTM D 4752-87. This procedure is used in the following examples but uses methyl isobutyl ketone in place of methyl ethyl ketone. Cured panels are tested by rubbing the surface of the panel with a cloth, saturated with methyl isobutyl ketone, for 50 double rubs. The rating system is as follows:

| Rating | Appearance of Coating |
|--------|----------------------|
| 1 | No noticeable effect on coating |
| 2 | Faint abrasion of coating |
| 3 | Moderate abrasion of coating |
| 4 | Significant abrasion of coating |
| 5 | Metal surface exposed. |

EXAMPLE 1

36.8 g bis(tributyltin) oxide (TBTO) are dispersed with 60.8 g aqueous unpigmented resin solution HEQ-8716 obtained from PPG Industries, Inc., an epoxy based resin. 10.75 g of the resulting emulsion are added to 1824 g of unpigmented E 5993, Trade Name "ED4 Resin" obtained from PPG Industries, Inc., an aqueous coating composition having a film-forming epoxy based resin to form a mixture. The mixture comprises an electro depositable cationic composition based on the reaction of an epoxy resin, an amine and a blocked polyisocyanate and does not contain any pigments or fillers. Steel panels, 100×150 cm, are coated on both sides when immersed to a depth of 120 cm in the resulting bath by electrodeposition at 240 volts with initial conductivity of 1 amp for 2 minutes. The coated panels are cured for 20 minutes at temperatures from 135° to 185° C. and tested for degree of cure by the MIBK rub test. The results of this experiment are shown in Table 1.

EXAMPLE 2

57.7 g bis(trioctyltin)oxide (TOTO) are dispersed with 60.8 g aqueous resin solution as in Example 1. 12.91 g of the resulting emulsion are added to 1824 g of an aqueous composition as in Example 1 and treated as in Example 1. The results of the experiment are shown in Table 1.

EXAMPLE 3

24.0 g bis(triphenyltin)oxide (TPTO) are ground with 32.1 g aqueous resin solution as in Example 1. 11.43 g of the resulting dispersion are added to 1824 g of an aqueous composition as in Example 1 and treated as in Example 1. The results of the experiment are shown in Table 1.

EXAMPLE 4

Control 308 g dibutyltin oxide (DBTO) are ground with 608 g aqueous resin solution as in Example 1. 10.0 g of the resulting dispersion are added to 1824 g of an aqueous composition as in Example 1 and treated as in Example 1. The results of the experiment are shown in Table 1. Dibutyltin oxide is an example of catalysts commercially used for cure of blocked isocyanates.

TABLE 1

Ratings for Abrasion by MIBK Rub Test
All catalysts 0.53 weight % tin based on solids; Oven cure 20 minutes

| Catalyst | Oven Temperature, °C. | | |
|----------|--------|--------|--------|
|          | 165.5–185 | 148.8 | 135 |
| DBTO | 1 | 4 | 5 |
| TBTO | 1 | 1 | 4 |
| TOTO | 1 | 1 | 3 |
| TPTO | 1 | 1 | 2 |

These results indicate significantly improved cure by the triorganotin oxides at 300°, compared to the control, dibutyltin oxide.

The voltage for each of the coating procedures in Examples 1–4 was 240 volts, while the conductivity dropped from the initial one amp to approximately zero during the course of the electrodeposition. The amperage drop for the electrodeposition of coating material employing TOTO in Example 2 was at a slower rate than the rate of drop for the electrodepositions in Examples 1 and 3–4, resulting in higher film thickness, especially as compared to the control Example 4 in which DBTO catalyst was employed.

EXAMPLE 5

Example 1 was repeated however, employing an equivalent amount of dibutyl tin oxide (DBTO) as a control and was cured at 180° C. and 150° C. The experiment was repeated using 50% and 25% of the tin catalyst on a stoichemetric basis. The panels obtained were subjected to a MIBK rub test and a solvent extraction test which was conducted by initially weighing the 10×5 cm steel panel, coating the panel with a 7×5 cm coating and curing the panel as set forth in Example 1 followed by weighing the cured coating. The panel was refluxed in acetone for six hours, weighed and the percent weight loss determined.

The experiment was repeated using various organo tin catalysts in an amount comprising 1.0%, 0.5% and 0.25% tin by weight based on the weight of the resin solids of the coating composition. Panels were electrolytically coated at either 240 volts or 220 volts and cured at 180° C. and 150° C. and subjected to a MIBK rub test and solvent extraction test. The results are reported in Table 2.

The data of Table 2 illustrate that the catalysts of the present invention can effect cures of urethane compositions at temperatures below 180° C. and are superior to DBTO at lower temperatures.

TABLE 3

| | % Weight Loss Acetone | | | | | |
|---|---|---|---|---|---|---|
| | 180° Cure | | | 150° Cure | | |
| Catalyst | % Tin on Solids | | | | | |
| Compound (volts) | 1% | 0.5% | 0.25% | 1% | 0.5% | 0.25% |
| DBTO | 0.3 | −1.5 | −0.9 | 20.6 | 56.1 | 72.0 |
| TOTO | 4.5 | 1.3 | 0.5 | 8.1 | 7.0 | 20.6 |
| TOTO | 4.8 | | | 8.0 | | |
| TOTO (220) | 3.0 | 1.9 | 2.8 | 5.3 | 6.4 | 18.3 |
| TEHTO | 4.6 | 0.9 | 0.3 | 10.7 | 26.5 | 47.9 |
| TBTO | −1.0 | 0.3 | 5.2 | 8.2 | 26.0 | 50.3 |
| TPTH | −0.0 | −1.8 | 4.1 | 9.5 | 30.3 | 53.5 |
| TDTO (220) | 5.4 | 1.0 | −0.3 | 7.2 | 15.5 | 39.6 |
| TCTH | 5.4 | 2.1 | 5.1 | 17.6 | 41.2 | 63.8 |
| TOTA (240) | 2.7 | 1.1 | 3.0 | 20.3 | 32.1 | 56.3 |
| TOTA (220) | 4.8 | 5.2 | 3.3 | 17.0 | 24.0 | 11.4 |
| TOTL | −2.7 | 0.1 | 14.3 | 42.1 | 58.6 | 68.4 |
| TOTS (220) | 3.0 | 8.3 | 20.8 | 55.6 | 47.5 | 62.8 |

| | MIBK Double Rubs | | | | | |
|---|---|---|---|---|---|---|
| | 180° Cure | | | 150° Cure | | |
| | % Tin on Solids | | | | | |
| | 1% | 0.5% | 0.25% | 1% | 0.5% | 0.25% |
| DBTO | 200+ | 200+ | 200+ | 30 | 5 | 2 |
| TOTO | 200+ | 200+ | 200+ | 200+ | 40 | 20 |
| TOTO | 200+ | | | 200+ | | |
| TOTO (220) | | | | | | |
| TEHTO | 200+ | 200+ | 200+ | 200+ | 50 | 1 |
| TBTO | 200+ | 200+ | 200+ | 200+ | 20 | |
| TPTH | 5 | | | | | |
| TDTO (220) | 50 | 200 | 200+ | 200+ | 150 | 1 |
| TCTH | 200+ | 200+ | 200+ | 100 | 5 | 1 |
| TOTA (240) | | | | | | |
| TOTA (220) | 200+ | 200+ | 200+ | 50 | 2 | 4 |
| TOTL | 200+ | 200+ | 20 | 2 | 2 | 2 |
| TOTS (220) | 200+ | 50 | 2 | 3 | 2 | 2 |

The following compounds are employed and listed in Table 2.
Compounds
DBTO (control): Dibutyltin oxide
TOTO: Bis(trioctyltin) oxide
TEHTO: Bis[tri(2-ethylhexyl) tin] oxide
TBTO: Bis(tributyltin) oxide
TPTH: Triphenyltin hydroxide
TDTO: Bis(tridodecyltin) oxide
TCTH: Tricyclohexyltin oxide
TOTA: Trioctyltin acetate
TOTL: Trioctyltin laurate
TOTS: Trioctyltin laurylmercaptide The compositions of the present invention can be employed in the manufacture of surface coating compositions which include pigments and fillers, both of which are well known in the surface coating art.

The coatings are applied to metal substrates electrolytically by immersing the substrate in a bath of the coating composition and applying an electric current between the substrate and a counter-electrode in electrical contact with the aqueous coating until a desired coating thickness is deposited on the substrate. The substrate is preferably a cathode.

The metal substrates and especially automobile parts may be coated in an assembly-line manner by arranging the parts on a continuous conveyor belt and running them through the coating bath continuously while passing an electric current between the metal article and a counter electrode as described previously. When the coating is built to a desired thickness, the substrate will be lead out of the bath, washed and cured at an elevated temperature continuously in an oven until the desired degree of cure is obtained, whereupon the metal substrate will be led out of the oven and removed from the coating line for further treatment.

During the electrolytic coating, the coating bath through which the metal substrates are passed and coated is continuously or periodically replenished with the coating composition or components of the coating composition such as the resin, and/or tin catalysts as described herein.

The foregoing coating compositions are formulated without any pigment or filler and the triorgano tin catalysts employed are liquid catalysts or catalysts that are soluble in the solvent system employed in the coating composition. The liquid organo tin catalysts, are preferably employed. Where the liquid catalysts are employed, the coating composition does not require any grinding and shows improved quality in that no "dirt" or precipitated solids develop in the coating bath due to the coating composition. As a result, no solids or less "dirt" is coated onto the metal substrates and further pumping and filtration of the coating composition in the immersion tank is either eliminated or minimized. The liquid catalysts that are used in this regard comprise TBTO and TOTO and satisfactory cures are obtained at about 150° C. (approximately 300° F). Faster coating times i.e., greater throwing power is also obtained using TOTO as well as thicker coatings. This affords additional impact or chip resistance in applications such as applying the coating to automotive undercarriages and side panels exposed to impact from road debris. These thicker coatings also exhibit better corrosion resistance not only because of their thickness but also because pigments are eliminated thereby minimizing the amount of pinholing in the coating. Additionally, when employing catalysts such as TOTO better edge coating of the metal parts is also obtained.

The coating compositions using TOTO are also less toxic than other triorgano tin catalysts employed and present less of an environmental and health hazard than such other triorgano tin catalysts which is of some consequence where the contents of the immersion coating tanks have to be periodically discharged and replenished.

The coating compositions of the present invention are also applied to polymeric substrates including both thermoplastic and thermosetting polymers, especially polyolefins, phenolics, polyvinylchlorides, polyvinylidine chlorides and fluorides, polyesters, ABS polymers, acrylics, epoxys, polyamides, Teflon® and the like.

The coating composition is applied by dipping, brushing, spraying, roller coating or by electrodeposition on electroconductive polymeric compositions or metallic substrates.

It will be apparent to those skilled in the art that various modifications and variations can be made to the curable composition containing a catalyst for the low temperature cure of blocked isocyanates or blocked isothiocyanates as well as the method of the invention for obtaining such low temperature cures without departing from the spirit or scope of the invention. It is intended that these modifications and variations of this invention are to be included as part of the invention, provided they come within the scope of the appended claims and their equivalents.

What is claimed is:

1. A process for increasing the environmental safety of a coating electrolytically applied to a conductive substrate and catalyzed with a tin catalyst comprising applying to said substrate a curable conductive coating composition comprising:

(i) a blocked reactive component wherein said blocked reactive component is a blocked isocyanate or a blocked isothiocyanate;

(ii) a functional compound reactive with said blocked reactive component, said functional compound containing active hydrogen;

(iii) a catalyst consisting essentially of a trialkyl tin catalyst in which said alkyl group has from 8 to 21 carbons;

(iv) water;

passing an electric current between the substrate and a counter-electrode in electrical contact with said coating until a desired coating thickness is deposited on said substrate and curing said coating at a temperature below about 150° C.

2. The process of claim 1 wherein said alkyl group has 8 carbons.

3. The process of one of claims 1–2 wherein:

(I) said blocked reactive component comprises a blocked polyisocyanate; and (ii) said functional compound reactive with said blocked reactive component comprises a polyfunctional compound containing active hydrogens.

4. The process of claim 3 wherein said functional compound reactive with said blocked polyisocyanate comprises a polyfunctional compound containing active hydrogens wherein said active hydrogens comprise at least hydroxyl hydrogens of a primary amine epoxy adduct or a secondary amine epoxy adduct.

5. The process of claim 3 wherein said functional compound reactive with said blocked polyisocyanate comprises a polyfunctional compound containing active hydrogens wherein said active hydrogens comprise at least hydroxyl hydrogens of a secondary amine epoxy adduct.

6. The process of claim 3 wherein said functional compound reactive with said blocked polyisocyanate comprises a polyfunctional compound based on a ketimine blocked amine having at least one active amine hydrogen wherein said ketimine blocked amine is reacted with an epoxy compound.

7. The process of claim 3 wherein said functional compound reactive with said blocked polyisocyanate comprises a polyfunctional compound containing active hydrogens based on a quaternary ammonium salt group solubilized synthetic organic resin formed from reacting a tertiary amine-acid salt with a polyepoxide which contains glycidyl groups.

8. A process as in claim 3 wherein said functional compound reactive with said blocked polyisocyanate is solubilized with acid to provide cationic groups in said adduct.

9. A process as in one of claims 1–2 wherein said catalyst is a liquid at about room temperature.

10. A process as in claim 9 wherein said conductive coating composition is substantially free of solid pigments or fillers.

11. The process of claim 3 wherein said coating is conducted in a bath and said bath is replenished after the coating operation is carried out with a replenishing material wherein said replenishing material is said coating composition or said catalyst.

12. A product produced by the process of claim 1.
13. A product produced by the process of claim 2.
14. A product produced by the process of claim 3.
15. A product produced by the process of claim 4.
16. A product produced by the process of claim 5.
17. A product produced by the process of claim 6.
18. A product produced by the process of claim 7.
19. A product produced by the process of claim 8.
20. A product produced by the process of claim 9.
21. A product produced by the process of claim 10.

* * * * *